US005380445A

United States Patent [19]

Rivard et al.

[11] Patent Number: 5,380,445
[45] Date of Patent: Jan. 10, 1995

[54] PRETREATMENT OF MICROBIAL SLUDGES

[75] Inventors: Christopher J. Rivard, Lakewood; Nicholas J. Nagle, Louisville, both of Colo.

[73] Assignee: Midwest Research Institute, Kansas City, Mo.

[21] Appl. No.: 139,840

[22] Filed: Oct. 22, 1993

[51] Int. Cl.[6] .................................................. C02F 1/36
[52] U.S. Cl. ...................................... 210/748; 210/769; 210/738; 210/607
[58] Field of Search ............... 210/748, 607, 623, 624, 210/625, 626, 173, 769, 768, 738

[56] References Cited

U.S. PATENT DOCUMENTS

| | | | |
|---|---|---|---|
| 2,138,839 | 12/1938 | Chambers | 210/748 |
| 3,264,213 | 8/1966 | Pav et al. | 210/748 |
| 3,389,997 | 6/1968 | Allen | 210/748 |
| 3,806,448 | 4/1974 | Smith et al. | 210/748 |
| 3,961,078 | 6/1976 | Stitt | 426/41 |
| 4,086,057 | 4/1978 | Everett | 210/748 |
| 4,132,638 | 1/1979 | Carlsson | 210/623 |
| 4,270,279 | 6/1981 | Roediger | 210/609 |
| 4,290,890 | 9/1981 | Bauer | 210/608 |
| 4,340,488 | 7/1982 | Toth et al. | 210/748 |
| 4,341,632 | 7/1982 | Gregor et al. | 210/608 |
| 4,861,519 | 8/1989 | Tusa et al. | 210/603 |
| 4,944,886 | 7/1990 | Masri | 210/748 |
| 4,961,860 | 10/1990 | Masri | 210/748 |
| 4,988,442 | 1/1991 | Highsmith et al. | 210/609 |
| 5,087,378 | 2/1992 | Kovacs | 210/742 |

*Primary Examiner*—Neil McCarthy
*Attorney, Agent, or Firm*—Edna M. O'Connor

[57] ABSTRACT

Methods are described for pretreating microbial sludges to break cells and disrupt organic matter. One method involves the use of sonication, and another method involves the use of shear forces. The pretreatment of sludge enhances bioconversion of the organic fraction. This allows for efficient dewatering of the sludge and reduces the cost for final disposal of the waste.

9 Claims, No Drawings

PRETREATMENT OF MICROBIAL SLUDGES

CONTRACTUAL ORIGIN OF THE INVENTION

The United States Government has rights in this invention under Contract No. DE-AC02-83H10093 between the United States Department of Energy and the National Renewable Energy Laboratory, a Division of the Midwest Research Institute.

BACKGROUND OF THE INVENTION

1. Field of the Invention

This invention relates generally to methods for the pretreatment of microbial sludges to enhance subsequent biodegradation. More specifically, this invention relates to techniques for pretreating microbial sludges using sonication and shear forces.

2. Description of the Prior Art

Modern municipal sewage waste treatment plants utilize conventional mechanical and biological processes to reclaim wastewaters in a process which has an overall effect of converting a water pollution problem into a solid waste disposal problem (sludges). In a typical modern treatment plant the large objects and the grit are separated. Then the wastewater goes to the primary sedimentation tanks which remove 50%–70% of the suspended solids and 25%–40% of the $BOD_5$. This sludge and the ground screenings are sent to anaerobic digestion. The wastewater then flows to the aeration tanks, where the colloidal and dissolved organic matter are converted into gases (primarily $CO_2$) and cell mass by the aerobic growth of microorganisms, principally bacteria. The cell mass is then removed in the secondary sedimentation step and sent to anaerobic digestion. Increasingly, a final biological step is used to reduce the nitrogen content of the effluent by converting the ammonia to nitrate and then to nitrogen gas. This process also produces a biological sludge. The combined sludges are thickened to increase their solids content and sent to anaerobic digestion. The primary purposes of digestion are to reduce the organic content, volume, and odor potential of the sludge, and to reduce the concentration of pathogenic microorganisms (Metcalf & Eddy 1979, U.S. EPA 1979, Arora 1980, Federal Register 1989). The dewatered sludge from anaerobic digestion is the largest solid output from sewage treatment plants and presents the major disposal problem.

The disposal of microbial sludge solids resulting from conventional municipal sewage treatment has historically been expensive because of the extremely large volumes with which these sludges are produced. These sludges contain high fractions of volatile solids (VS), they retain large amounts of water (70–85% before drying), and because of the substantial bulk of the waste, transportation and disposal costs are significant. Recently, the costs for disposal of these microbial sludges through conventional landfilling has risen dramatically because of decreasing landfill availability. In some areas microbial sludges are banned altogether from the landfill because of the high pollution potential which these materials represent.

In light of the increasing cost for disposal of sewage derived microbial sludges, a substantial amount of work has been expended into alternatives to landfill disposal such as technology which may further reduce the water content of sludges in order to reduce the bulk of the waste requiring disposal. Public concern over possible hazardous emissions through combustion processes and possible heavy metal contamination from the resulting ash has reduced acceptance of combustion (Samela, et al. Environmental Aspects of the Combustion of Sewage Sludge in a Utility Boiler, Environ. Progress, 5:110, 1986) as a disposal option for municipal sewage sludges. The land application of sewage sludge is also problematic as biological activity produces methane and residual volatile solids result in organics contaminating groundwaters.

The cost of disposing of a given amount of sludge is often high and is growing higher. Further, increased loads on existing treatment plants also lead to sharply higher disposal costs. Increasing environmental requirements on the quality of wastewater treatment have resulted in a more complex process which produces greater microbial biomass for disposal. See Laughton, P. J., "Upgrading a Water Pollution Control Plant to Meet Stringent Effluent Discharge Requirements", Water and Pollution Control, 117:14 (1979). The greater organic loading of wastewater streams has created a higher stress on the treatment process that often reduces the organic removal efficiency. See Mungsgaard et al., "Flow and Load Variations at Wastewater Treatment Plants", J. Water Pollution Control Fed., 52:2131 (1980). This reduced efficiency degrades the sludge's dewatering properties, substantially increasing the water content and volume of the waste. See Rutherford et al., "Realities of Sludge Dewatering", Proceedings of the National Conference on Municipal Treatment Plant Sludge Management, Orlando, Fla. (1986). Finally, reduced dewatering efficiency requires increased use of organic polymers to facilitate dewatering. See Novak et al., "Mixing Intensity and Polymer Performance in Sludge Dewatering", J. Environ. Engineer, 114:1 (1988); Bandak et al., "Polymer Performance in Sludge Conditioning", Proceedings of the Eighteenth Mid-Atlantic Industrial Waste Conference, Lancaster, Pa. (1986); Doyle et al., "Sludge Conditioning With Organic Polyelectrolytes", Proceed. of the Nat'l. Conf. on Municipal Treatment Plant Sludge Management, Orlando, Fla. (1986). Increased polymer usage increases both the disposal costs and the organic loading of the waste stream. The net result is that the amount and cost of sludge disposal can increase disproportionally when an existing plant must deal with increased loadings and clean-up requirements.

Most recent research has focused on reducing the volume of waste by improved dewatering. See Knocke et al., "Effect of Mean Cell Residence Time and Particle Size Distribution on Activated Sludge Vacuum Dewatering Characteristics", J. Water Pollution Control Fed., 58:1118 (1986); Barraclough et al., "Start-Up Optimization of the Mechanical and Chemical Parameters Influencing the Dewatering Performance of a Gravity Belt Filter Press Operation", Proceedings of the Eighteenth Mid-Atlantic Industrial Waste Conference, Blacksburg, Va. (1986); Katsiris et al., "Bound Water Content of Biological Sludge in Relation to Filtration and Dewatering", Water Res. 21:1319 (1987); Harries et al., "Design and Application of a Modern Solid/Liquid Separation Plant", S. African Mech. Engin., 37:481 (1987); Cobb et al. "Optimizing Belt Press Performance at Smurfit Newsprint", Tappi Proceedings—1987 Environmental Conference, Portland, Oreg. However, the pollution potential of the sludge is unchanged since the dewatering does not reduce the VS fraction.

The volatile solids content of sludges that have already been anaerobically digested range from 40%–75% and the content of undigested sludge is even higher. See Downing et al. "Used-Water Treatment Today and Tomorrow", Ecological Aspects of Used-Water Treatment, Vol. 2, C. R. Curds and H. A. Hawkes, Eds. (1983); Ramalho, Intro. to Wastewater Treatment Processes, 2nd ed. N.Y.: Academic Press (1983). Clearly, the potential for further reductions in sludge volume still exists.

There has not heretofore been provided effective and efficient techniques for pretreating microbial sludges to disrupt the macro-structure of the sludge, break cells open, and enhance subsequent biodegradation.

SUMMARY OF THE INVENTION

One object of the invention is to provide an improved method for pretreating microbial sludge with sonication or shear forces, or both, to disrupt microbial macrostructure to enhance bioconversion of the organic fraction of the sludge.

Another object of the invention is to provide a method for pretreating microbial sludges derived from disposal of organic waste for enhancing subsequent bioprocessing of the sludges.

Another object of the invention is to provide a method for pretreating microbial sludge to break cells and disrupt organic matter to increase the surface area and enhance the level of biodegradation.

Additional objects, advantages, and novel features of the invention shall be set forth in part in the description that follows and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the method of the invention may comprise destruction or disruption of the microbial macro-structure of the sewage-derived sludge so as to enhance anaerobic or aerobic bioconversion of the organic fraction of the waste and thereby reduce fuel gas (methane) or offensive odor production during final disposal.

Following secondary aerobic or anaerobic digestion, the reduced organic content of the waste allows for efficient dewatering of the sludge (e.g., allowing for final sludge solids content of 40 to 60%). Reduction in sludge organic content serves to reduce additional biological activity (i.e., methane production) of the sludge during final disposal (i.e., in landfills or as used for compost applications). Reduction of organic content in the sludge also serves to reduce the potential for odor production during final disposal. Reduction in sludge bulk also serves to reduce costs for shipping and final disposal of the waste.

An evaluation of the macro-structure of municipal sludges reveals that the bulk of the organic content is composed of microbial cells derived from aerobic and anaerobic processing of the wastewater organics. Therefore, pretreatment technologies which will disrupt microbial cells will be best suited to the disruption of the sludge macrostructure.

In one embodiment the invention provides a method for pretreating the sludge using sonication to disruption microbial cells. In another embodiment a pretreatment method is provided which involves the use of shear forces to disrupt microbial cells. Pretreatment could also involve use of both methods on the same sludge. Pretreatment also serves to destroy potentially pathogenic microorganisms which may be present in sewage-derived sludges.

Other advantages of the techniques and methods of this invention will be apparent from the following detailed description.

DETAILED DESCRIPTION OF THE PREFERRED EMBODIMENTS

The present invention provides a simple and effective means of pretreating microbial sludge to break cells apart and also to disrupt the microbial macrostructure of sewage-derived sludge. Several advantages are realized by virtue of the disruption of the organic structure of the sludge, including:

1. Enhanced aerobic and anaerobic bioconversion of the organic fraction of the waste (which results in reduced methane production upon disposal, e.g., in landfills or in compost applications).

2. Following secondary digestion of the sludge, the reduced organic content of the waste allows for efficient dewatering. The projected enhancement in dewaterability should allow for final sludge solids contents of 40%–60%.

3. Reduction in sludge organic content serves to reduce the potential for odor production during final disposal.

4. Pretreatment serves to destroy potentially pathogenic microorganisms which may be present in sewage-derived sludges.

5. Reduction in sludge bulk serves to reduce costs for shipping and final disposal of the waste (avoided costs).

Thus, the pretreatment processes of the present invention are effective and provide numerous benefits.

It has been determined that anaerobic digestion of municipal sewage sludges, without pretreatment of the sludges, was not effective in reducing the bulk of the waste. Rather, it was found that a pretreatment was necessary in order to enhance the bioprocessing of the waste.

A variety of pretreatment techniques were examined to disrupt the macro-structure of the microbial sludge and thereby enhance its subsequent biodegradation. However, conventional pretreatments involving thermal treatment, thermal treatment under acid conditions, thermal treatment under alkaline conditions, as well as enzymatic treatments, were found to be of minimal value in enhancing the biodegradation of the microbial sludges.

The use of hydrolytic enzymes as a pretreatment to break down polymers such as protein and peptidoglycan (bacterial, cell wall materials) was evaluated. Treatments utilizing two different enzyme loadings and at treatment times of 0 to 4 hours resulted in only minimal enhancement of the anaerobic bioconversion potential as compared to non-treated sewage sludge.

However, two thermal/mechanical pretreatments tested were found to have a dramatic effect on the subsequent bioconversion of the microbial sludges. Both technologies evaluated, sonication and shear, were found to be affected by sludge solids levels, duration of treatment, and treatment temperature.

Sludge used for pretreatment studies was obtained from the Denver Municipal Waste Water Reclamation Plant. The sludge had been centrifuged to 16% total solids. The material was taken from the plant and stored in barrels at 4° C. until used. Sludge was pretreated by sonication and shear forces to break open the microbial biomass and release the soluble components.

The sample preparation was identical for both methods of pretreatment. Three levels of loadings of sewage sludge were used 1, 2, and 3% total solids on a dry weight basis. The material was weighed into a 250 ml beaker and enough water was added to achieve 100 ml of volume. Samples were pretreated for 10 minutes, temperature and sub-samples were taken at two-minute intervals. Each pretreated sub-sample was diluted 1 to 10, centrifuged and the supernatant analyzed for chemical oxygen demand using the EPA approved micro method.

The sonicator used was a Braunsonic model #1510 by B. Braun company. The standard probe that comes with the sonicator was used for this pretreatment. The tip of the probe was immersed into the beaker and the power was set to 300 watts. Sub-samples and temperature were taken and analyzed.

The instrument used for the shear pretreatment was a Ultra-Turex knife mill model #SD-45, made by Tekmar company. The knife head was immersed in the sample and power was slowly brought up to 70% of controller capacity. Sub-samples and temperature were taken and analyzed.

Power measurements were performed by two methods. Amperage was measured using a Fluke model 83 multimeter, watts were calculated by multiplying amperage times voltage. The second method used a TIF model 2000 watt probe that read watts directly. Watts/hour were calculated by dividing the watts by the time in minutes for the pretreatment and normalizing for one hour. The data collected from these experiments is shown in Table I.

TABLE I

| Method | % Solids | Power (Watts/hr) | Watts/hr per gm dry wt | % COD Release |
|--------|----------|------------------|------------------------|---------------|
| Shear | 1 | 23.8 | 23.8 | 86.7 |
| | 2 | 25.8 | 12.9 | 88.6 |
| | 3 | 33.9 | 11.3 | 54.1 |
| Sonication | 1 | 23.2 | 23.2 | 80.4 |
| | 2 | 34.0 | 17.0 | 48.6 |
| | 3 | 34.3 | 11.4 | 46.7 |

Optimum sonication pretreatment occurred with sludge solids of 1% and treatment times of 4–8 minutes. The most effective treatment temperature tested was 55° C. (although a temperature range of about 50° to 60° C. is useful). The optimum enhancement in bioconversion potential for the sonication pretreatment was over 80% of the materials carbon oxygen demand (COD) content.

The optimum shear pretreatment occurred with sludge solids of 1–2% and treatment times of 6–10 minutes. The most effective treatment temperature tested was 87° C. (although a temperature range of about 80° to 90° C., is useful). The optimum enhancement in bioconversion potential for the shear pretreatment was over 86% of the materials COD content.

The useful power ranges for both shear and sonication pretreatments are 5 to 35 watt/hr/gram of dry weight of sludge (with 10 to 25 watt/hr/gram being preferred).

The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. A method for pretreating microbial sludge derived from biological treatment of sewage to break open cells and release organic matter from said cells thereby enhancing subsequent biodegradation of said organic matter, the method comprising subjecting said sludge, at an elevated temperature, to a destabilizing force selected from the group consisting of sonication, shear force, and combinations of sonication and shear force having a magnitude in the range of about 5 to 35 watt/hr/gram of dry weight of said sludge; wherein said elevated temperature is in the range of from about 50° C. to 90° C. and wherein said sludge comprises an aqueous medium containing less than about 3% solids by weight.

2. A method in accordance with claim 1, wherein said aqueous medium contains about 1% solids.

3. A method in accordance with claim 1, wherein said aqueous medium is at a temperature in the range of about 50° to 60° C.

4. A method in accordance with claim 1, wherein said aqueous medium is subjected to sonication.

5. A method in accordance with claim 1, wherein said aqueous medium is subjected to sonication for a time of about 4 to 8 minutes.

6. A method in accordance with claim 5, wherein said destablizing force has a magnitude in the range of about 10 to 25 watt/hr/gram of dry weight of said sludge.

7. A method in accordance with claim 1, wherein said aqueous medium is subjected to a shear force.

8. A method in accordance with claim 7, wherein said aqueous medium is at a temperature in the range of about 80° to 90° C.

9. A method in accordance with claim 1, wherein said aqueous medium is subjected to sonication and shear forces.

* * * * *